(12) United States Patent
Whitney et al.

(10) Patent No.: US 8,904,306 B1
(45) Date of Patent: Dec. 2, 2014

(54) VARIABLE SPEED SCROLLING

(75) Inventors: Jason K. Whitney, Lee's Summit, MO (US); Michael T. Lundy, Olathe, KS (US); Yat-Sang Hung, San Diego, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1030 days.

(21) Appl. No.: 12/138,143

(22) Filed: Jun. 12, 2008

(51) Int. Cl.
*G06F 3/048* (2013.01)
*G06F 3/01* (2006.01)

(52) U.S. Cl.
USPC .......... 715/786; 715/784; 715/781; 345/684; 345/156

(58) Field of Classification Search
USPC .......... 715/781, 784, 786, 864; 345/156, 684, 345/173
See application file for complete search history.

(56) References Cited

U.S. PATENT DOCUMENTS

| | | | | |
|---|---|---|---|---|
| 5,615,325 A * | 3/1997 | Peden | ............................ | 715/854 |
| 5,689,667 A * | 11/1997 | Kurtenbach | ................... | 715/810 |
| 6,239,803 B1 * | 5/2001 | Driskell | ......................... | 715/810 |
| 6,300,967 B1 * | 10/2001 | Wagner et al. | ................ | 715/784 |
| 6,337,694 B1 * | 1/2002 | Becker et al. | ................. | 345/684 |
| 6,470,383 B1 * | 10/2002 | Leshem et al. | ................ | 709/223 |
| 7,716,060 B2 * | 5/2010 | Germeraad et al. | .......... | 705/310 |
| 7,786,975 B2 * | 8/2010 | Ording et al. | ................ | 345/156 |
| 7,941,765 B2 * | 5/2011 | Fleck et al. | .................... | 715/834 |
| 2004/0095395 A1 * | 5/2004 | Kurtenbach | .................. | 345/810 |
| 2005/0212823 A1 * | 9/2005 | Uthe et al. | ..................... | 345/660 |
| 2006/0274053 A1 * | 12/2006 | Kinouchi | ....................... | 345/173 |
| 2007/0136690 A1 * | 6/2007 | MacLaurin et al. | .......... | 715/822 |
| 2007/0300186 A1 * | 12/2007 | Kim et al. | ..................... | 715/828 |
| 2009/0128500 A1 * | 5/2009 | Sinclair | ........................ | 345/173 |
| 2010/0137031 A1 * | 6/2010 | Griffin et al. | ................. | 455/566 |
| 2010/0174993 A1 * | 7/2010 | Pennington et al. | .......... | 715/738 |
| 2010/0275150 A1 * | 10/2010 | Chiba et al. | ................... | 715/784 |
| 2012/0216139 A1 * | 8/2012 | Ording et al. | ................. | 715/773 |

OTHER PUBLICATIONS

"Move boxes around in organisation chart" OfficeKB.com, Dec. 9, 2006 http://www.officekb.com/Uwe/Forum.aspx/word-graphics/6399/Move-boxes-around-in-organisation-chart.*

* cited by examiner

*Primary Examiner* — Nicholas Augustine
*Assistant Examiner* — Toan Vu

(57) ABSTRACT

A method, system, and medium are provided for allowing a user to scroll through a list of items on a display, such as contacts, pictures, or other files, at variable speeds, which provides for fast, yet accurate scrolling. The user provides an indication to scroll through the list of items, such as pressing and dragging or flicking through the list. This indication may include a starting point and ending point at a certain location on the display. Depending on where the user provides this indication on the display, a scroll speed is determined at which to scroll through the list of items. As the indication of a scroll action progresses from one side of a display to the other, the scrolling speed increases such that the exact same scroll action corresponds to differing scrolling speeds, depending on the position of the user's indication of a scroll action on the display.

18 Claims, 16 Drawing Sheets

VARIABLE SPEED SCROLLING

SUMMARY

The present invention is defined by the claims below. This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention provide systems, methods, and computer-readable media for, among other things, enabling a user to scroll through a list of items on a display at variable speeds. An indication from a user, such as an indication of a scroll action, may be received to scroll through the list of items. The indication of the scroll action may be received in a certain portion of the display, which may determine a rate at which the list of items is moved.

Accordingly, in one aspect, one or more computer-readable media having computer-useable instructions embodied thereon for performing a method of scrolling at variable speeds through a list of items that are presented on a display of an electronics device is provided. The method comprises displaying at least a portion of the list of items on the display, and receiving an indication from the user that indicates a scroll action to scroll through the list of items, wherein the indication includes a starting point and an ending point that are in a certain portion of the display. Based on the certain portion, a speed to scroll through the list of items is determined. The method further comprises scrolling through the list of items at the determined speed.

In another aspect, one or more computer-readable media having computer-useable instructions embodied thereon for performing a method of enabling a user to scroll at variable speeds through a list of items on a display of a mobile communications device is provided, wherein the display is a touchscreen. The method comprises displaying at least a portion of the list of items on the display, and receiving an input on the display by way of a touch action from a user that indicates a desire to move through the list of items, wherein the display is divided into more than one region. The input is received within one of the regions. Additionally, the method comprises moving the list of items at a scrolling rate determined by the region where the input is received.

In a further aspect, a mobile communications device is provided that comprises a first storage component that stores a list of items, a touchscreen that receives input by way of touch actions and that displays a user interface, and a set of computer-useable instructions embodied in a second storage component that provides for a display of at least a portion of the list of items that, when scrolled though, accelerates at a rate dependent upon a position on the touchscreen of the touch action. The touch action comprises a starting point and an ending point. Upon release of the touch action, the list of items decelerates.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
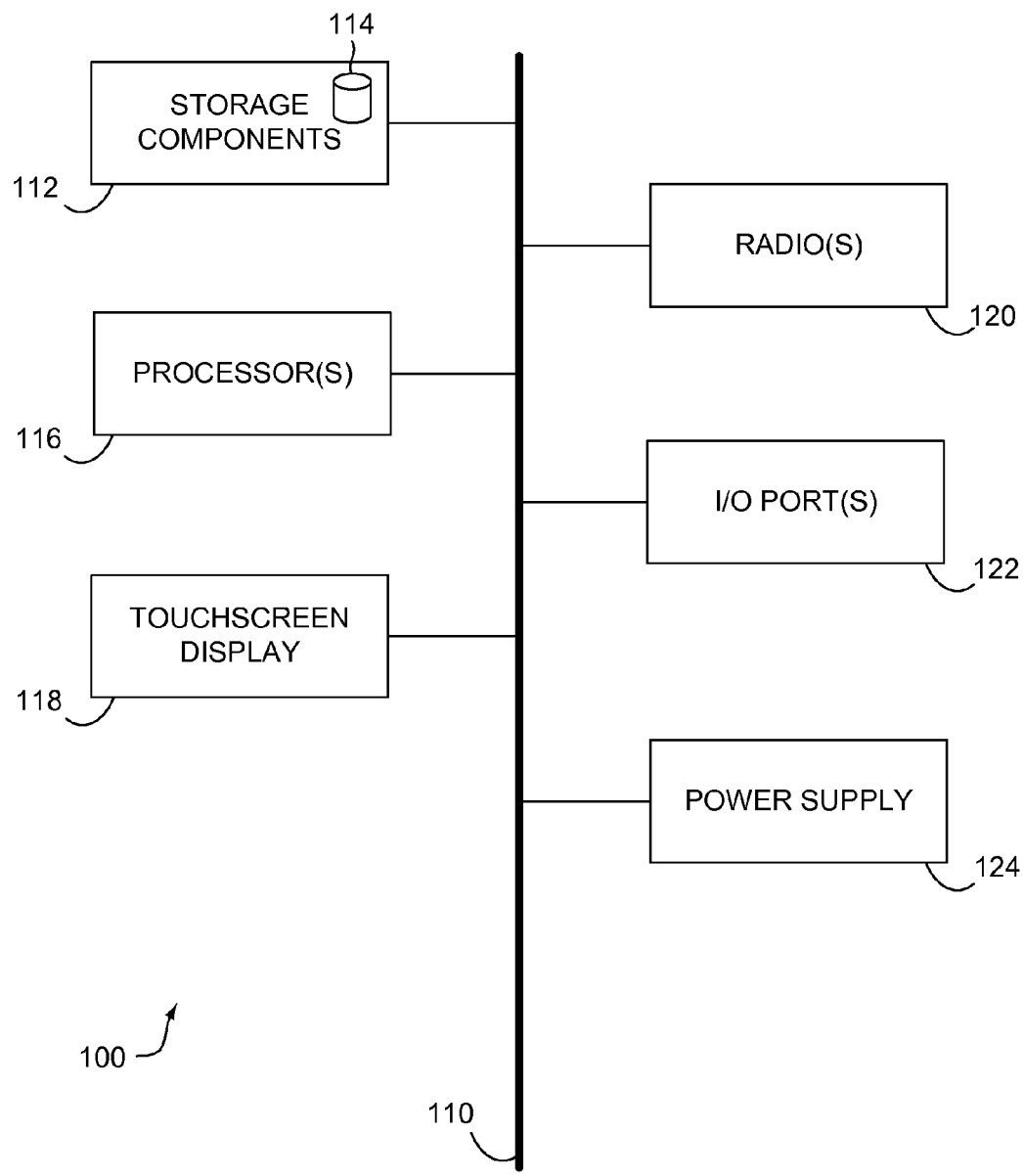
FIG. 1 is a block diagram of an exemplary mobile communications device that is suitable for operation, in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CD-ROM | Compact Disk Read Only Memory |
| CDMA | Code Division Multiple Access |
| DVD | Digital Versatile Discs |
| FAX | Facsimile |
| LAN | Local Area Network |
| MMS | Multimedia Messaging |
| PDA | Personal Digital Assistant |
| RAM | Random Access Memory |
| ROM | Read Only Memory |
| TV | Television |

Further, various technical terms are used throughout this description. A definition of such terms can be found in *Newton's Telecom Dictionary* by H. Newton, 23rd Edition (2007). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

Embodiments of the present invention may be embodied as, among other things, a method, system, or computer-program product. Accordingly, the embodiments may take the form of a hardware embodiment, a software embodiment, or an embodiment combining software and hardware. In some embodiments, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, computer-readable media comprises computer-storage media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

FIG. 1 depicts an illustrative block diagram of a mobile communications device that is suitable for operation of an embodiment of the present invention. FIG. 1 depicts a selection of components that will generally be included in the mobile communications device to help facilitate various functional aspects of embodiments of the invention. As shown, a bus 110 couples, directly or indirectly, the following illustrative components: a storage component 112, a processor 116, a touchscreen display 118, a radio 120, input/output ports 122, and a power supply 124.

Storage components 112 may take the form of the aforementioned computer-readable media. As with all of the illustrative components of FIG. 1, although we refer to them sometimes in the singular, that should not be read so as to imply that we mean only a single of each of the components is contemplated within the scope of our invention. To the contrary, by way of example, storage component or components 112 may actually be composed of constituent storage components located within mobile device 100. A portion or separate storage component includes database 114. In one embodiment, as will be explained in greater detail below, database 114 can be used to store a library of words or terms that can be referenced in connection with facilitating text entry by way of a keyboard presented on touchscreen display 118.

Processors 116 facilitate a flow of information among all or a portion of the components shown in FIG. 1 as well as computer-usable instructions that help facilitate various aspects of the present invention. For example, in one embodiment, an operating system of mobile device 100 also helps coordinate various functional aspects of the present invention. Processors 116 operate in connection with running such an operating system.

Touchscreen display 118 provides one avenue of inputting data into device 100. In one embodiment, touchscreen display 118 takes the form of a resistive touch screen, but in some embodiments, it might be capacitive. Touchscreen display 118 receives input by way of touch actions that cause a device to come in contact with touchscreen display 118. An illustrative example includes a user utilizing his or her finger to tap or use some other form of touch action to interact with mobile device 100. Other items such as a stylus, fingernail, etc., may be used to provide input to mobile device 100 by way of touchscreen display 118. Other illustrative touch actions include a sliding motion as well as multipoint touches.

Radios 120 facilitate the communication of wireless communication signals to and from mobile device 100. Illustrative protocols that can be utilized in connection with an embodiment of the present invention include CVMA, TVMA, GSM, GPRS, EVVO, etc. The radios facilitate wireless communications between the device and a national or even global telecommunications network.

Input/output ports 122 provide a way for mobile device 100 to interact with other peripheral components. Illustrative input/output ports include an ear-piece or headphone jack, a USB port, an infrared port, and the like. Different input/output ports could be provided as is needed to facilitate communication of other peripheral components.

Power supply 124 may also take on a variety of forms ranging from a battery to a charging mechanism to other forms of power sources that serve to provide power to mobile device 100.

The selected components of mobile device 100 are meant to be illustrative in nature, and the various lower-level details of the components are not elaborated on so as to not obscure the present invention. Clearly, some of the components may be absent in some embodiments of the present invention, and additional components not shown may also be part of mobile device 100. Attempting to show all of the various components of mobile device 100 would obscure certain novel aspects, and we will refrain from such elaboration at least for the sake of brevity.

Figure 2:
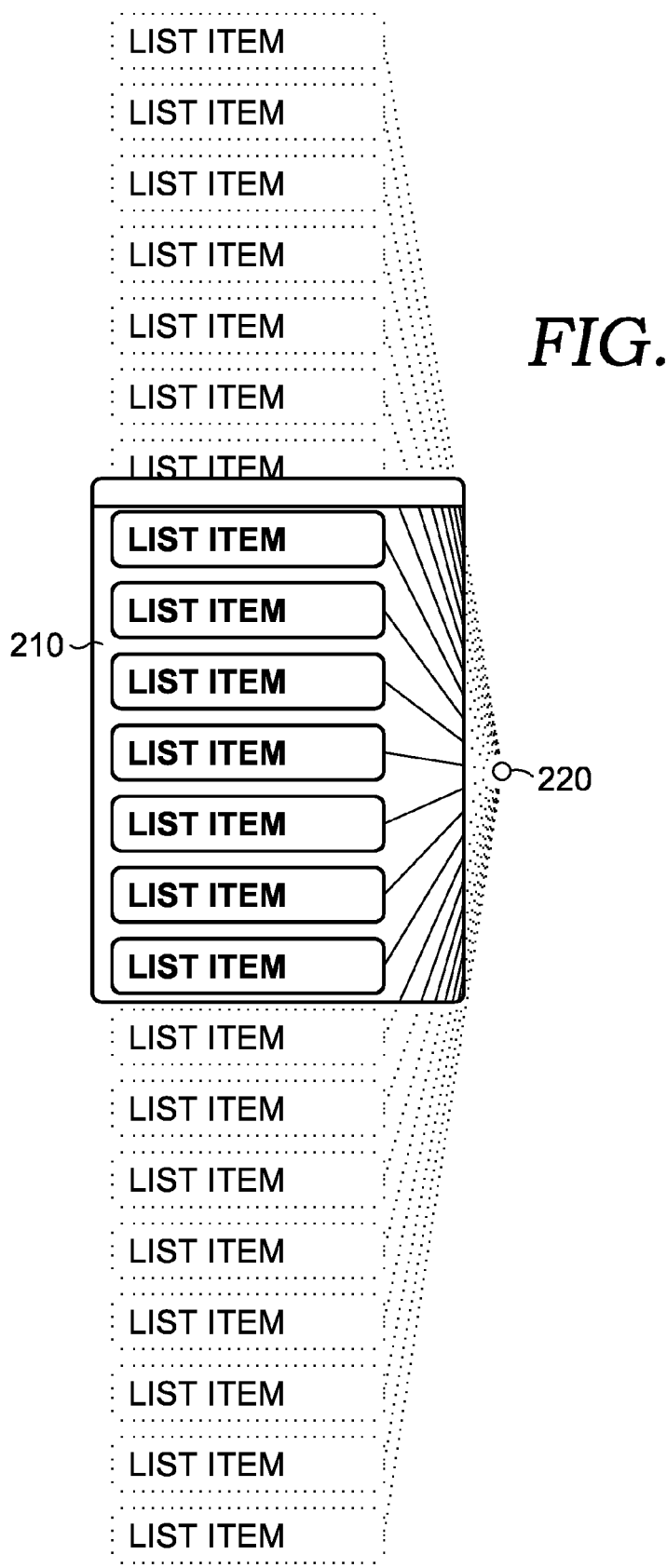
FIG. 2 depicts an exemplary display illustrating a set of lines, each line connecting an item in a list of items to a single point, in accordance with an embodiment of the present invention.

Turning to FIG. 2, an exemplary display 210 having a list of items, each item connected to a single point by a line, is shown. As illustrated in FIG. 2 and in other figures herein, items and lines outside of the display are shown, but are represented by dotted lines. This indicates that these portions of the figures are not visible to a user, as they are located outside of the display. We have included items and lines outside of the display in some of the figures to assist in the understanding of several concepts of the present invention.

FIG. 2 shows a list of items, each item, even those not visible on the display, being connected to a single point 220 by a line. The combination of the lines, or a set of lines, may provide a user with a visual indication as to a length of the list of items (e.g., the number of items contained in the list of items), in addition to a current position within the list of items (e.g., whether the user is viewing a portion of the list of items near the top of the list, near the middle of the list, or near the bottom of the list). Additional functionality of these concepts will become evident as various figures are discussed herein. FIG. 2 displays a portion of the list of items on the display 210, and illustrates that the portion of the list of items on the display may be near the middle of the list, as there are an approximately equivalent number of items above and below the display, which would not be visible to a user. It may, however, be apparent to a user that the portion of the list of items displayed is at or near the middle of the list of items by the lines visible on the display corresponding to the items that are not visible on the display. As there are approximately the same number of lines on the display corresponding to items not visible on the display on both the top and bottom of the display, it may become apparent to a user that there are items above, and items below the portion of the list of items shown on the display.

As previously discussed, the set of lines are connected to a single point. In the embodiment of FIG. 2, the single point is not visible to a user of the device, as it is not located on the display. However, in another embodiment, the single point 220 may be visible to a user if the single point is located on the display. Also, as shown in FIG. 2, each item in the list of items has a width, which in the embodiment of FIG. 2, consumes a majority of a width of the display. In some embodiments, the width of the items may be varied so that the width of the items may not consume a majority of the width of the display. In addition to the width of the items being variable, the location of single point 220 may also be variable. As shown, single point 220 and the set of lines are integrated in such a way as modifying the position of single point 220 may alter several aspects of the display, including, but not limited to the number of lines shown on the display. The position of the single point may increase or decrease the effectiveness of visual indication as to the length of the list and current position with the list of items. In FIG. 2, single point 220 is positioned relatively close to the display so that at least a portion of each line corresponding to the items is visible on the display.

Figure 15:
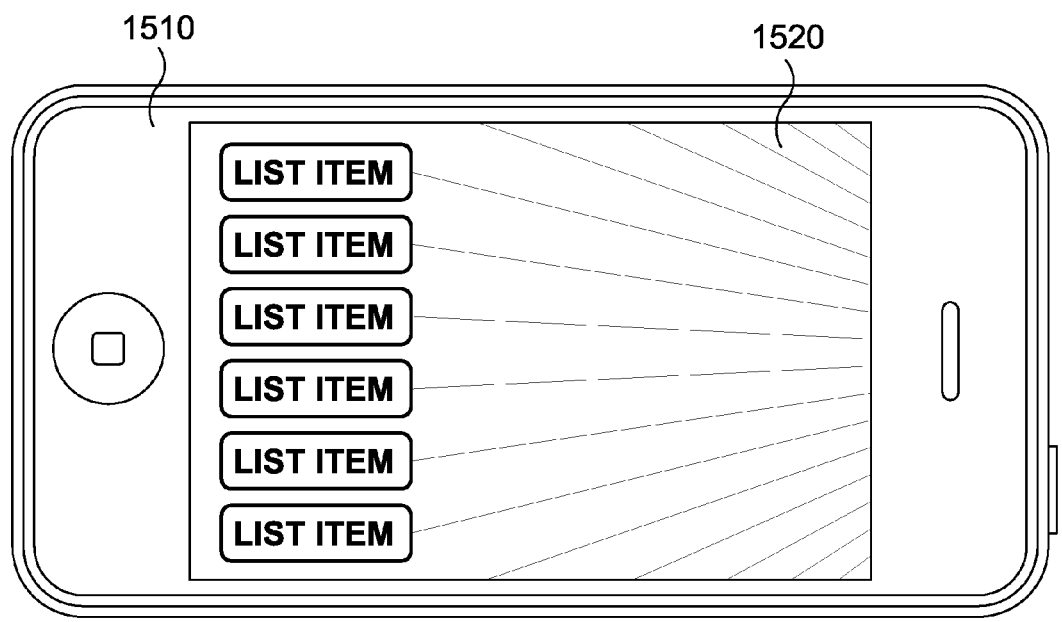
FIG. 15 depicts an exemplary display of a mobile telecommunications device in a horizontal position, illustrating a list of items connected to a single point by a set of lines, in accordance with an embodiment of the present invention.

In one embodiment, the number of items that are presented on a display may vary. This may vary according to a height of each item in the list of items, which may be modifiable. A smaller height may allow more items to be displayed. A user may want a larger area to display information pertaining to that particular item in one instance, but in another instance, may not need as large an area, such as if the amount of information pertaining to that item is relatively small. The number of items presented on a display may also vary according to the position of the device. For instance, the device may be positioned vertically, such as is illustrated in FIG. 2. The device, however, may be rotated so that it is positioned horizontally, as is illustrated in FIG. 15 herein.

Figure 3:
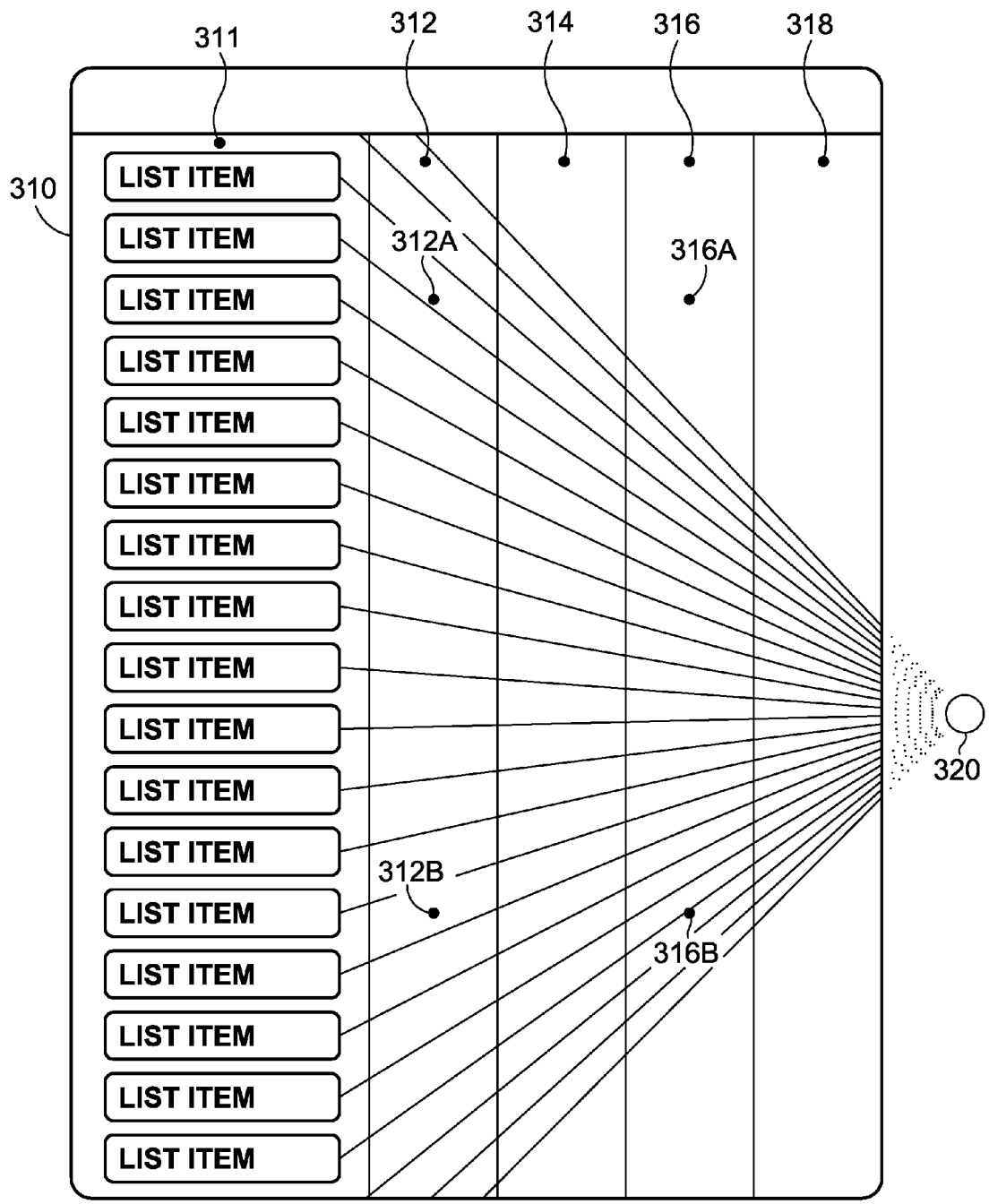
FIG. 3 depicts an exemplary display illustrating multiple regions of varying scrolling speeds, in accordance with an embodiment of the present invention.

FIG. 3 depicts an exemplary display 310 illustrating multiple regions 311, 312, 314, 316, and 318 of varying scrolling speeds, in accordance with an embodiment of the present invention. As shown here, each item in the list of items is connected to single point 320 by a line. Each of the multiple regions 311, 312, 314, 316, and 318 represent different scrolling rates. Although FIG. 3 illustrates five separate regions, there may be more or less than five regions. In one embodiment, there may not be a set number of regions, as there are infinite positions along the width of a display that may each have a different scrolling rate. In order to illustrate the concept of variable speed scrolling, we have used five regions in FIG. 3, although it is contemplated to be within the scope of the present invention that there may be more or less than five regions, or no predefined regions at all. Regions may be determined in a variety of ways. One way that regions may be determined is by pixels. For example, each region may be 1 pixel wide, or each region may be 10 pixels wide. This is variable, and may depend on a number of items in the list of items, location of the single point, etc. The scrolling speeds of each region may be predetermined, or may require use of an algorithm to determine speed according to a location on the display of a scroll action.

Region 311 of FIG. 3 contains at least a portion of the items in the list of items. Here, it is evident that only a portion is displayed, as there are lines on the display that connect single point 320 to items not visible on the display. Those items are not illustrated in FIG. 3. As previously mentioned, the present invention allows for a user to scroll at varying scrolling speeds through a list of items. A scrolling speed may be defined by a number of items moved in a certain period of time, such as a period of five seconds or ten seconds.

In one embodiment, the scrolling speed may be determined by a user's indication to scroll through a list of items, wherein the indication may be made in a number of ways. An indication may be made by a touch action, for example. An illustrative example of a touch action includes a user utilizing an object to interact with the display of mobile device 100 of FIG. 1, for example. An object may include, but is not limited to, a stylus, finger, or fingernail, each of which may provide a touch action to the display. A hardware component of a device, such as a switch or scroll wheel, may also be used to indicate a user's desire to scroll through a list of items. Regardless of which type of indication is used, an indication may comprise a starting point and an ending point that are in a certain portion of the display. For instance, in FIG. 3, region 311 displays at least a portion of the items in the list of items. A user may first provide a touch action to the display at a starting point (e.g., touch action starts at the top of the list of items) and move or slide an object (e.g., finger, fingernail, stylus) in a vertical motion down the display to an ending point (e.g., touch action ends at bottom of list of items). It may be clear to a user that the first item touched will move to the bottom of the list of items, as these clearly correspond to the user's touch action (e.g., beginning and ending points). The same beginning and ending points, but within a different region, may provide for the list of items to move further.

Within region 312, point 312A indicates a starting point, and point 312B indicates an ending point. If a user indication to scroll is received with these starting and ending points, the list of items may move so that an item corresponding to the line nearest to point 312A will progress down the display. The line corresponding to this item will eventually be displayed near point 312B. The movement of the list of items when 312A and 312B are the starting and ending points, however, may be contrasted to the movement of the list of items when the starting and ending points are positioned in another region of the display. As illustrated in FIG. 3, points 316A and 316B may be starting and ending points within region 316. Each line in-between points 316A and 316B may correspond to an item in the list of items, even if the item associated with a line is not displayed on display 310. As shown, there are more lines in-between points 316A and 316B than there are between 312A and 312B. Therefore, the list of items will move further, or faster with beginning and ending points of 316A and 316B, than with beginning and ending points of 312A and 312B. This allows a user to reach further up or down the list of items by leveraging a zoomed-out view of the list of items (e.g., positioning the indication to scroll over an area of the display other than directly over the list of items). In addition, beginning and ending points within region 318 located on the same horizontal axis as 316A and 316B, respectively, may actually include every line (e.g., every item in the list of items) in the embodiment of FIG. 3. A user, in this case, may scroll or move through the entire list of items with just one touch action, as the entire set of lines would be located between those two points within region 318.

In one embodiment of the present invention, a flick action may be used as a touch action to the display, instead of a press and drag action. In this embodiment, a flick action imparts velocity to the list of items and allows the list to slide up or down, depending on the direction of the flick action. An algorithm (e.g., linear algorithm) may be used to determine the velocity of the list, which in large part, may depend on the location of the flick action on the display. As the location of the flick action progresses from one side of the display to the other side (e.g., from left to right), the scrolling speed increases. For example, a flick action near the right side of a display may impart greater velocity to the list of items than the exact same flick action near the left side of the display. Here, a user may wish to impart a flick action near the right side of the display if the user desires to quickly move through the list of items, but may wish to impart a flick action near the left side of the display for a more accurate, and therefore slower, movement through the list of items. Upon release of the flick action, the list of items may decelerate, eventually reaching a stop. At the point of release, the velocity may be translated so that an applied algorithm may calculate a rate of deceleration of the list of items. Therefore, the same flick action may provide for different speed translations, depending on a region or portion of the display where the flick action is located.

Figure 4:
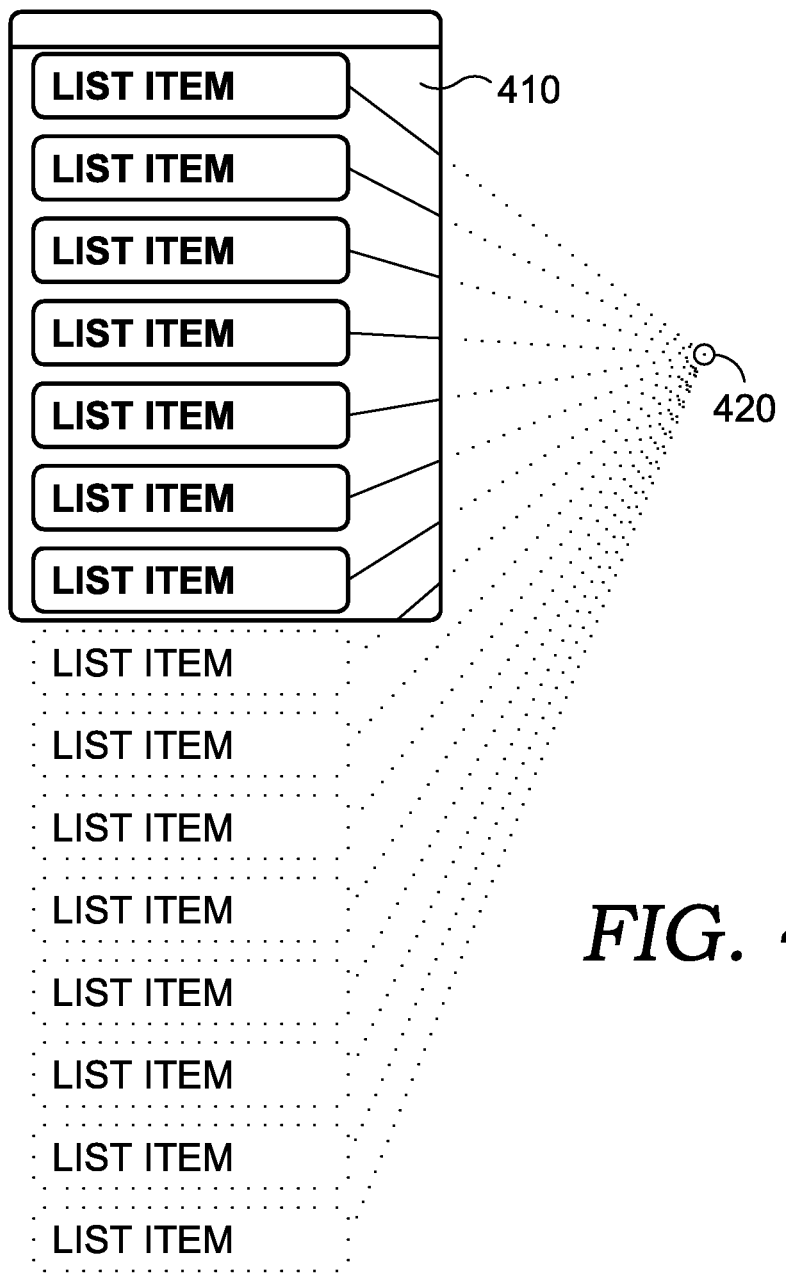
FIG. 4 depicts an exemplary display having a set of lines, each line connecting an item in a list of items to a single point, in accordance with an embodiment of the present invention.

Referring now to FIG. 4, an exemplary display 410 is illustrated having a set of lines, each line connecting an item in a list of items to a single point 420, wherein the first item is shown at the top of the display, in accordance with an embodiment of the present invention. FIG. 4 is provided to illustrate an embodiment of the present invention, wherein the top portion of the list of items is illustrated on the display, such as display 410. Each item is connected to a single point 420 by a line. Lines and items not necessarily visible on display 410 are represented by dotted lines.

Figure 5:
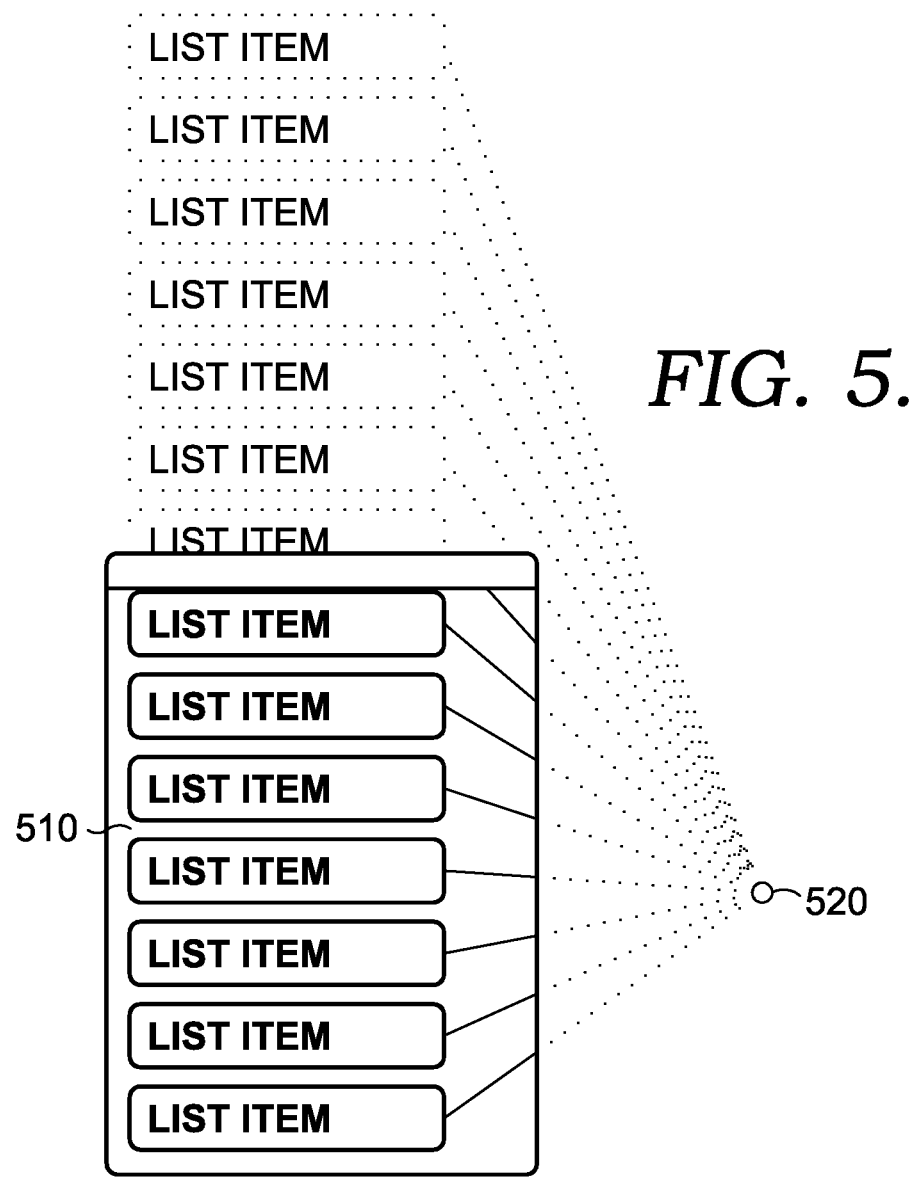
FIG. 5 depicts an exemplary display having a set of lines, each line connecting an item in a list of items to a single point, in accordance with an embodiment of the present invention.

FIG. 5 is similar to FIG. 4, but depicts an exemplary display 510 having a set of lines, each line connecting an item in a list of items to a single point 520, wherein the last item is shown on the bottom of the display, in accordance with an embodiment of the present invention. In both FIGS. 4 and 5, there is minimal space beside each list of items for scrolling through the list of items. This amount of space on the display, however, may be variable, and may vary depending on a number of factors.

Figure 6:
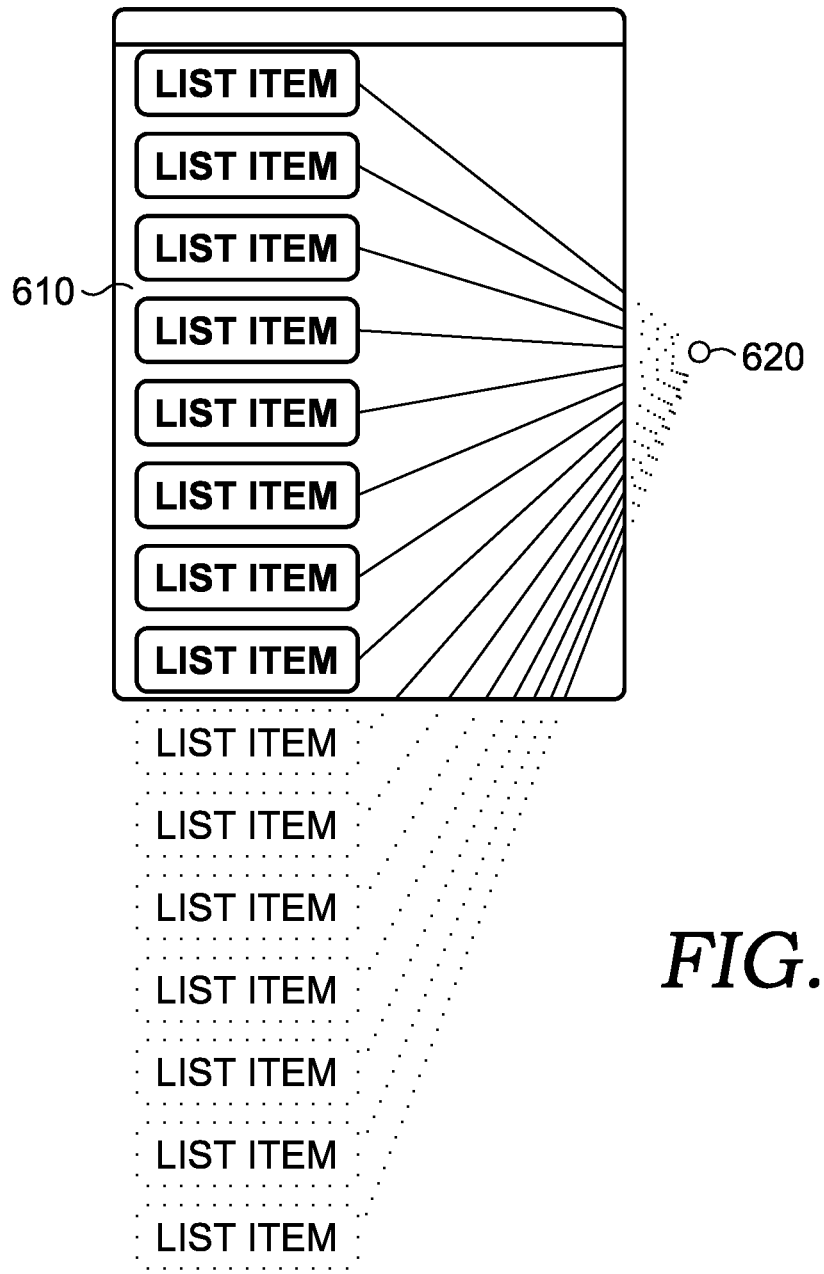
FIG. 6 depicts an exemplary display having a set of lines, each line connecting an item in a list of items to a single point, in accordance with an embodiment of the present invention.

FIG. 6 depicts an exemplary display 610 having a set of lines, each line connecting an item in a list of items to a single point 620, in accordance with an embodiment of the present invention. Here, as compared to FIGS. 4 and 5, there is more space beside the list of items for touch actions that indicate a desire to scroll through the list of items. The list of items consumes less than a majority of the width of display 610. As described earlier, the amount of space beside the list of items may be variable. In addition, single point 620 is located closer to display 610 than single points 420 or 520 in FIGS. 4 and 5. The location of single point 620 may be variable.

The location of single point 620 may have an impact on the variable scrolling speeds available on a display. The scrolling speed may increase as an indication of a scroll action progresses from one portion of display 610 to another portion. The closer single point 620 is to display 610, the more variance a user may have in scrolling speeds. As shown here, an indication of a scrolling action on or near the right side of display 610 allows a user to scroll through the entire list of items with one scrolling action (e.g., click and drag, flick action). A user may progress from the very top to the very bottom of a list of items without requiring multiple scrolling actions. As seen in both FIGS. 4 and 5, however, the same scrolling action on or near the right side of display 410 or 510 may not allow a user to scroll through the entire list of items with one scrolling action, as not all of the lines are visible on display 410 or 510. In one embodiment, the location of single point 620 may dynamically adjust based on a length of the list of items.

Figure 7:
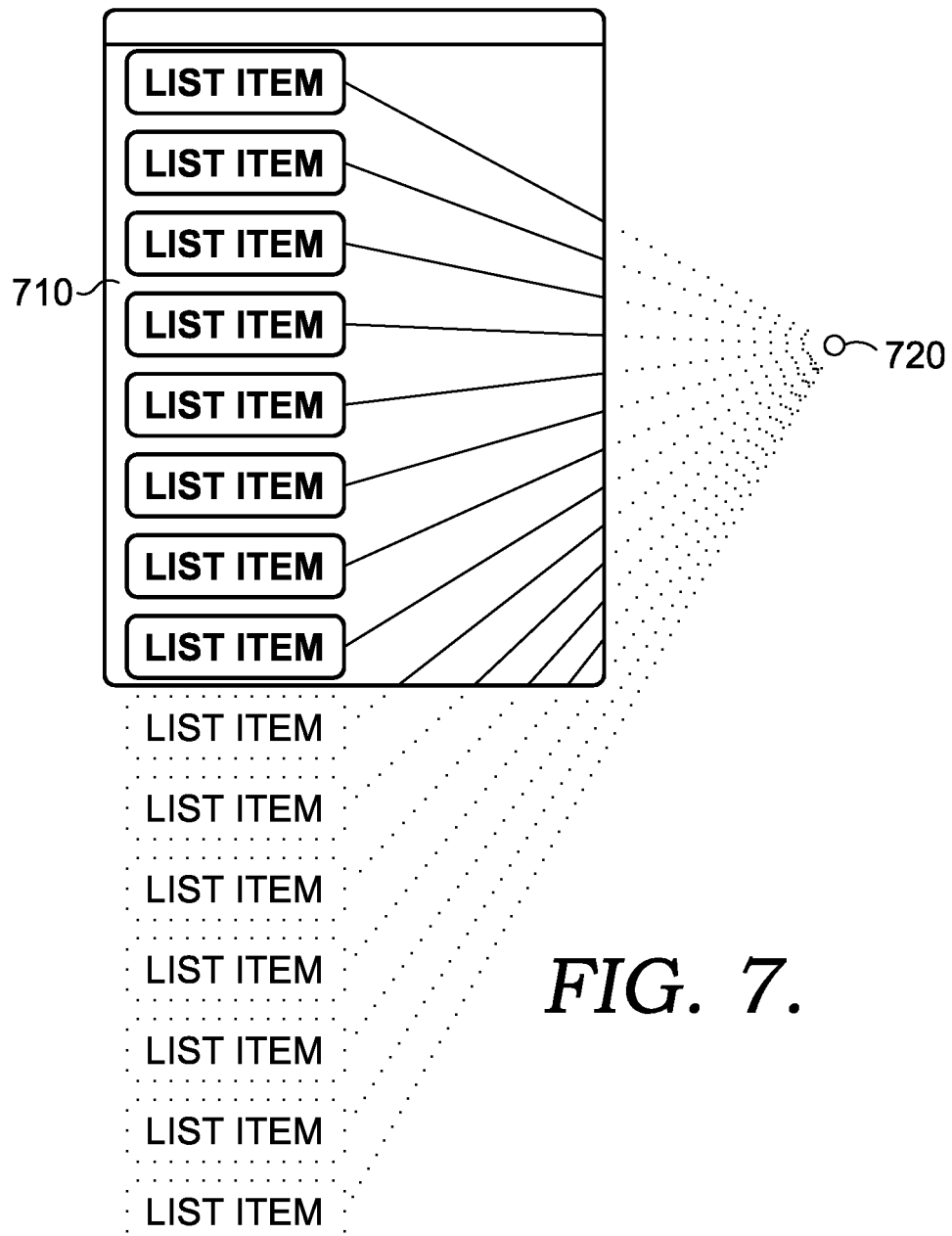
FIG. 7 depicts an exemplary display having a set of lines, each line connecting an item in a list of items to a single point, in accordance with an embodiment of the present invention.

FIG. 7 depicts an exemplary display 710 having a set of lines, each line connecting an item in a list of items to a single point 720, in accordance with an embodiment of the present invention. In FIG. 7, single point 720 is located further from display 710 than single point 620 is from display 610 in FIG. 6. As previously mentioned, the location of the single point may vary and may have an impact on the number of lines shown on a display, and therefore the available scrolling speeds. FIG. 6 and FIG. 7 contain the same number of items in the list of items, and therefore have the same number of lines connecting items in the list of items to the single point. FIG. 6, however, shows every line on display 610, as single point 620 is located relatively close to display 610. FIG. 7 does not show every line on display 710, as single point 720 is located further from display 710. Focusing on FIG. 7, if the scroll action comprises a beginning and ending point (e.g., press and drag action), a user may not be able to scroll through the entire list of items, even if the scroll action is located near the right side of display 710, as some of the lines are not visible on display 710. It may require two separate touch actions to scroll through the entire list of items.

A scroll action in the form of a flick, however, may allow a user to scroll through the entire list of items. As previously explained in regard to FIG. 3, the exact same flick action on various portions of a display may provide for variable speed scrolling. A flick action nearest the right portion of a display, for example, may provide for a scrolling through the entire list of items, wherein the same flick action near the left portion of the display (e.g., directly over the list of items) may provide scrolling at a slower speed, and thus may not scroll through an entire list of items with one flick action. The flick action imparts velocity to the list of items, which may accelerate until release of the flick action, wherein the list of items may decelerate to a stop.

Figure 8:
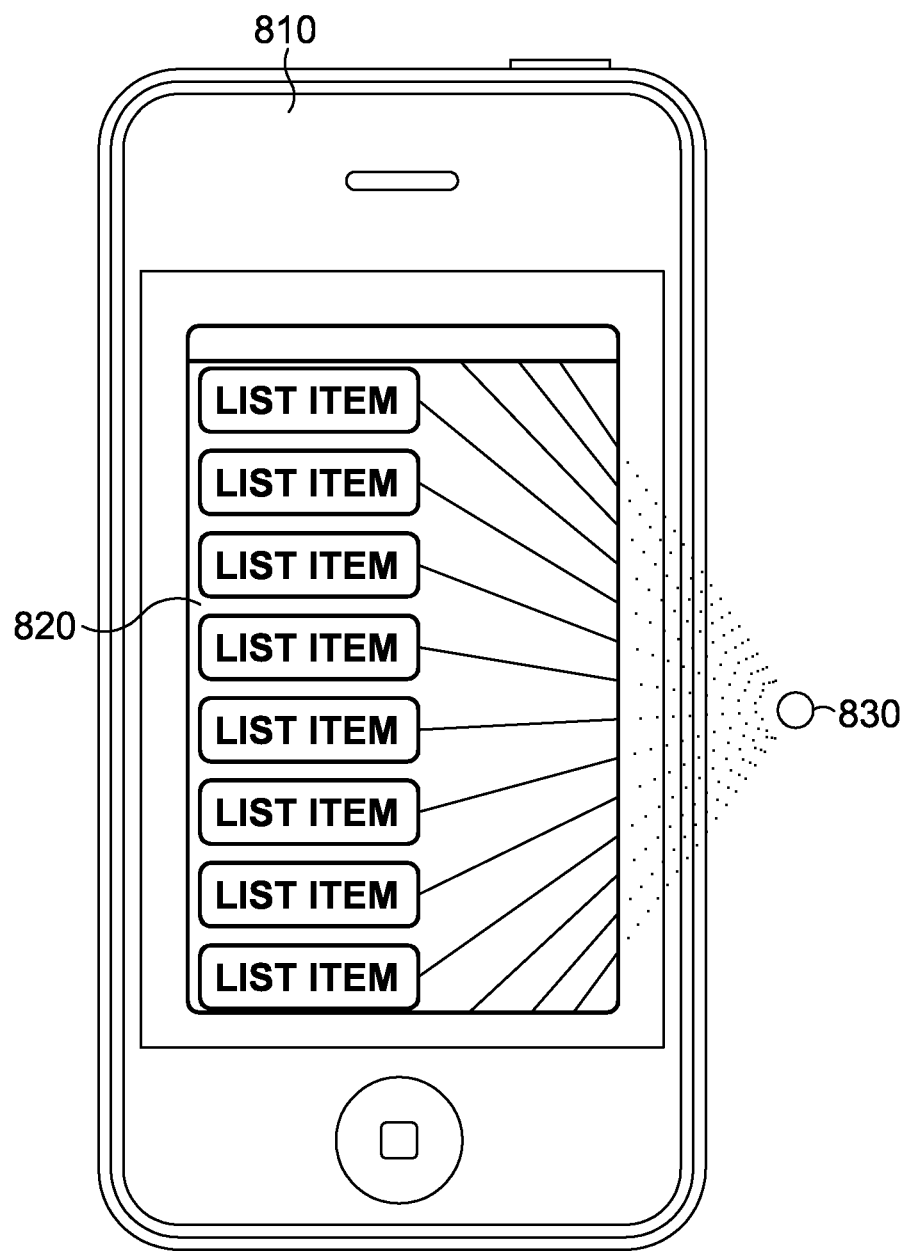
FIG. 8 depicts an exemplary display of a mobile telecommunications device, wherein each item in a list of items is connected to a single point by a line, in accordance with an embodiment of the present invention.

FIG. 8 depicts an exemplary display 820 of a mobile telecommunications device 810, wherein each item in a list of items is connected to a single point by a line, in accordance with an embodiment of the present invention. As shown, single point 830 is not visible on display 820, and therefore a portion of each line is also not visible on display 820. Thus, these portions are represented by dotted lines. FIG. 8 also illustrates that some of the items within the list of items are not visible on display 820, as there are three lines on the top and three lines on the bottom that are shown, but correspond to items not visible on the display.

Figure 9:
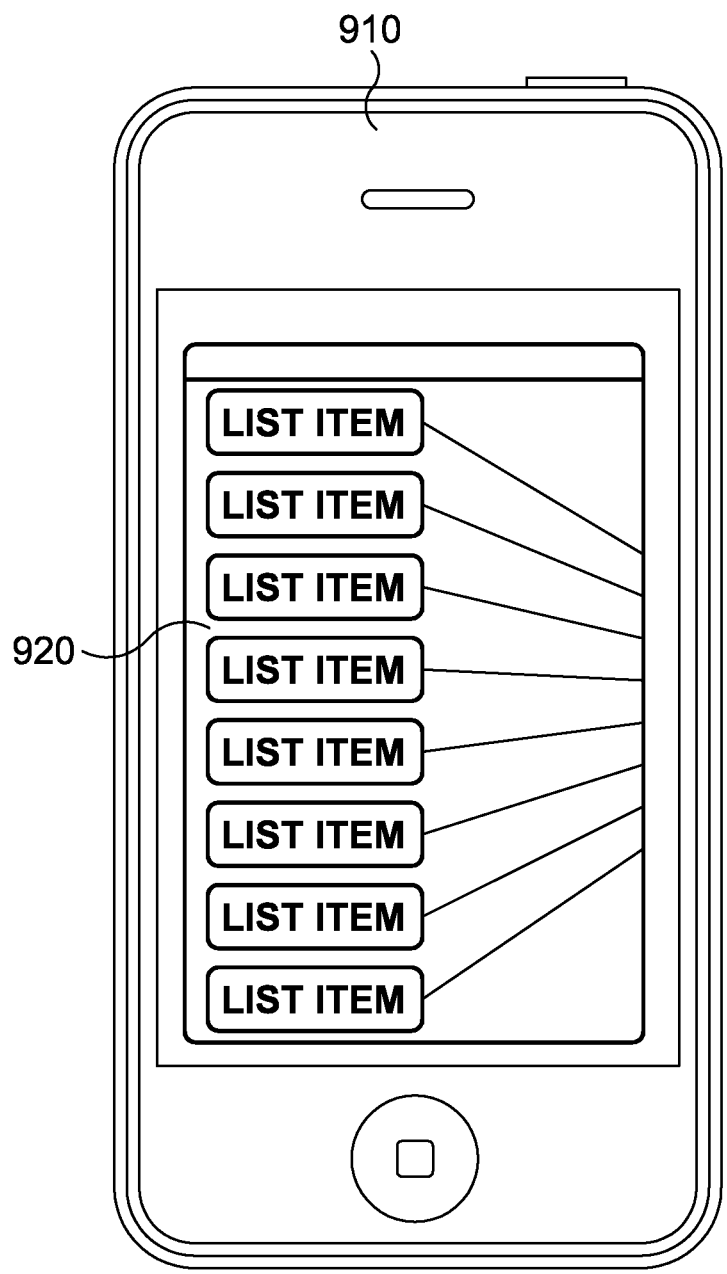
FIG. 9 depicts an exemplary display of a mobile telecommunications device, wherein each item in a list of items is connected to a single point by a line, wherein the point and set of lines outside the display are not shown, in accordance with an embodiment of the present invention.

Turning now to FIG. 9, an exemplary display 920 of a mobile telecommunications device 910 is illustrated, wherein each item in a list of items is connected to a single point by a line, wherein the single point and the lines outside the display are not shown, in accordance with an embodiment of the present invention. Similar to FIG. 8 and other figures herein, each item within the list of items is connected to a single point, but here, the single point is not shown, as it is located outside the display 920. The set of lines provides a user with a visual indication of the length of the list of items. Here, a user may observe that the entire list of items is visible on display 920, as there are no lines connecting the single point to an item not located on the display. Every line on display 920 is connected to an item that is shown on display 920.

Figure 10:
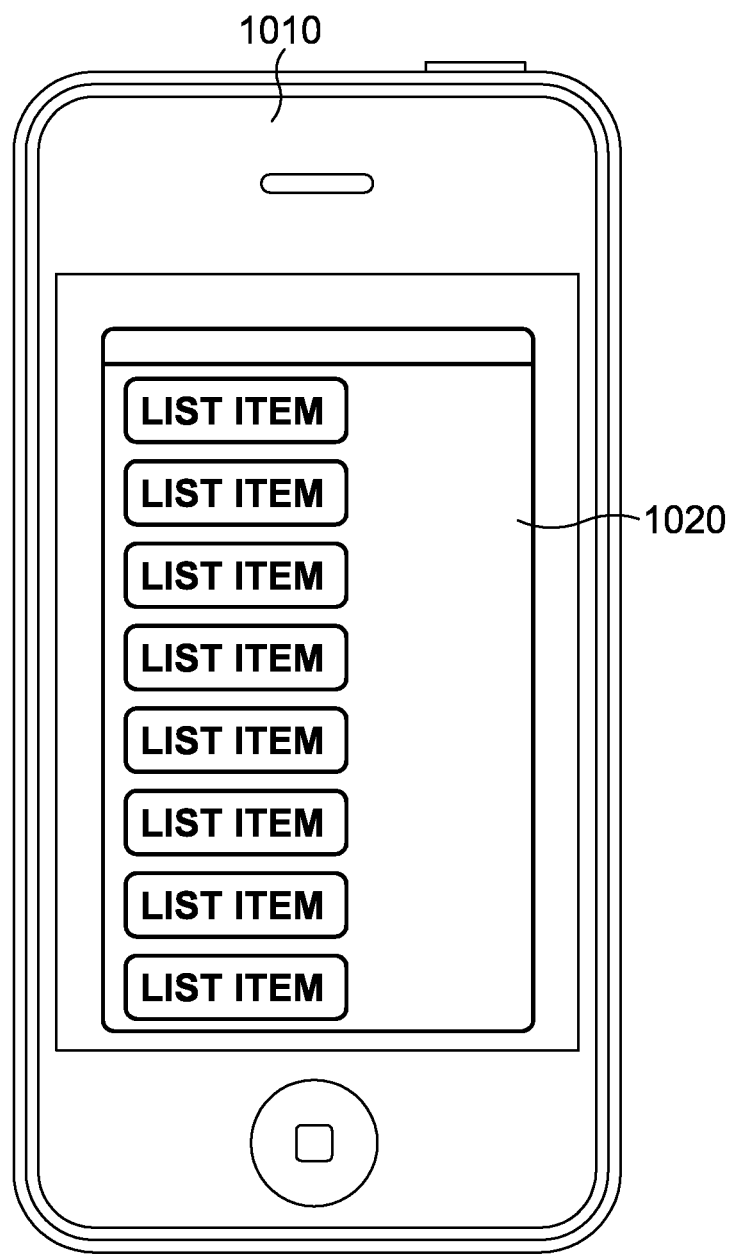
FIG. 10 depicts an exemplary display of a mobile telecommunications device illustrating a list of items, in accordance with an embodiment of the present invention.

FIG. 10 depicts an exemplary display 1020 of a mobile telecommunications device 1010 illustrating a list of items, in accordance with an embodiment of the present invention. The embodiment of FIG. 10 does not show the set of lines on display 1020, although the same variable speed scrolling mechanisms described above may still apply. For example, a user may scroll on any vertical axis on display 1020 to achieve variable speed scrolling, such that a scrolling action near the right side of display 1020 may scroll faster (e.g., more items are scrolled through with a scrolling action) than the same scrolling action near the left side of display 1020.

Figure 11:
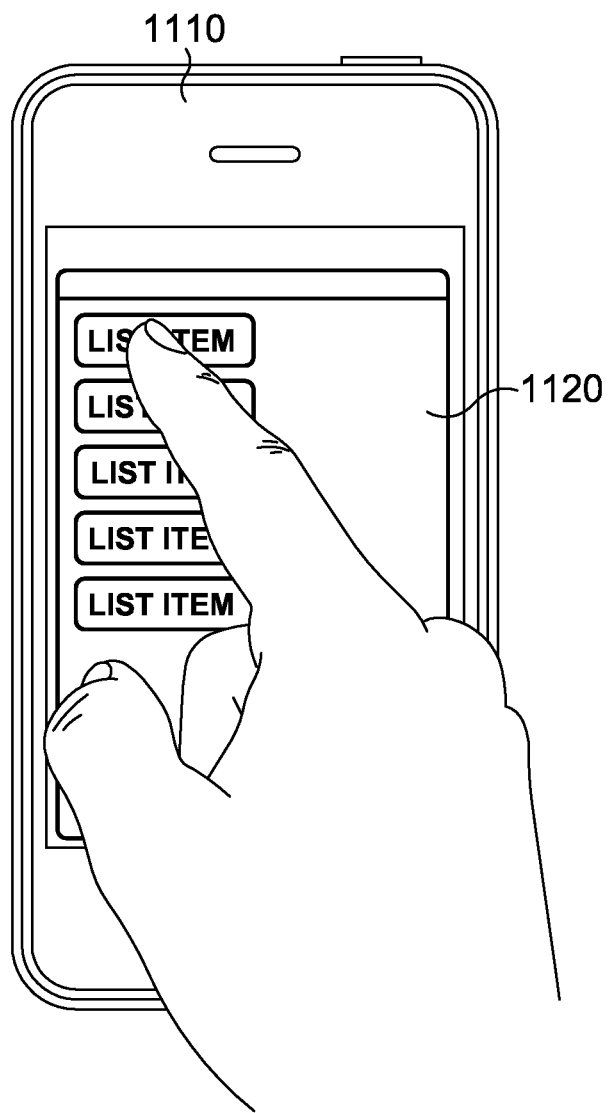
FIG. 11 depicts an exemplary display of a mobile telecommunications device illustrating a touch action in a region containing a list of items, in accordance with an embodiment of the present invention.

FIG. 11 depicts an exemplary display 1120 of a mobile telecommunications device 1110 illustrating a touch action in a region overlapping a list of items, in accordance with an embodiment of the present invention. Here, the touch action may be a press and drag or flick action. The touch action is illustrated directly over the list of items, and therefore the scrolling speed may be slower than a touch action further to the right of the list of items. Similar to FIG. 10, the set of lines are not visible on the display, according to an embodiment of the present invention.

Figure 12:
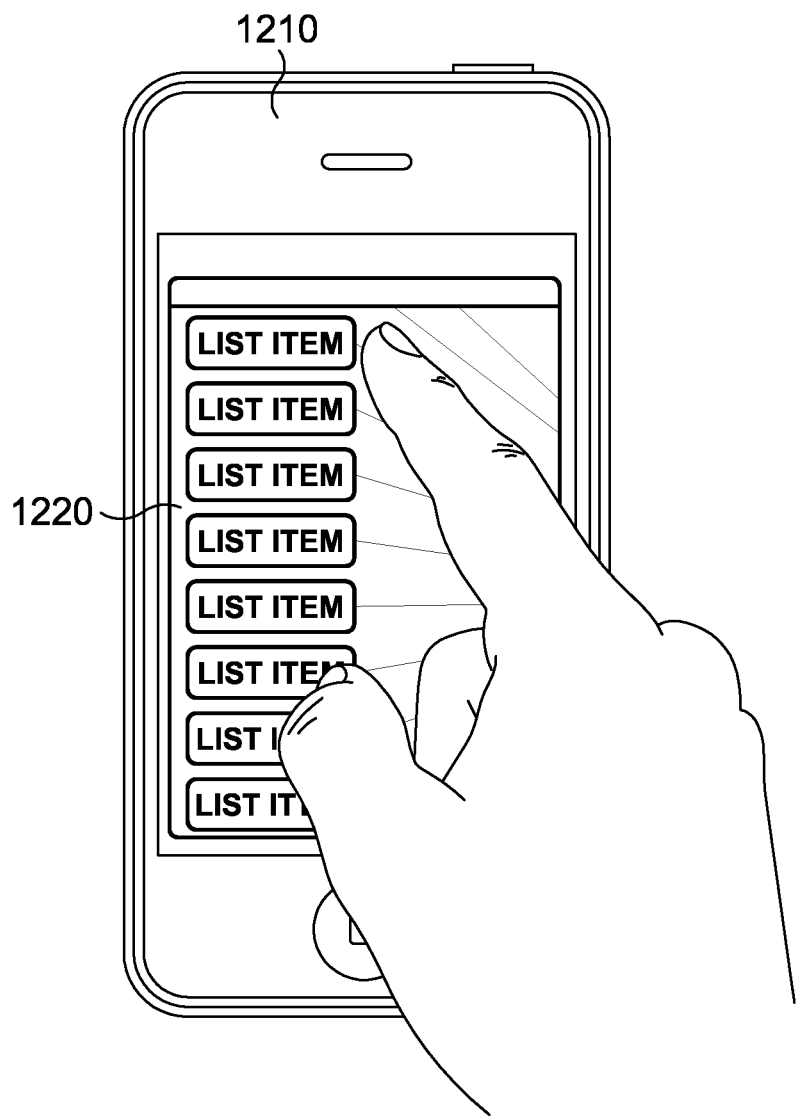
FIG. 12 depicts an exemplary display of a mobile telecommunications device illustrating a touch action in a region beside a list of items, in accordance with an embodiment of the present invention.

Referring to FIG. 12, an exemplary display 1220 of a mobile telecommunications device 1210 illustrates a touch action in a region beside a list of items, in accordance with an embodiment of the present invention. Here, the set of lines is visible on display 1220, and the touch action is not located on the list of items, but beside it. Therefore, the scrolling speed may be faster than the scrolling speed in the embodiment of FIG. 11 with the exact same touch action (e.g., same flick action, beginning and ending points on same horizontal axis).

Figure 13:
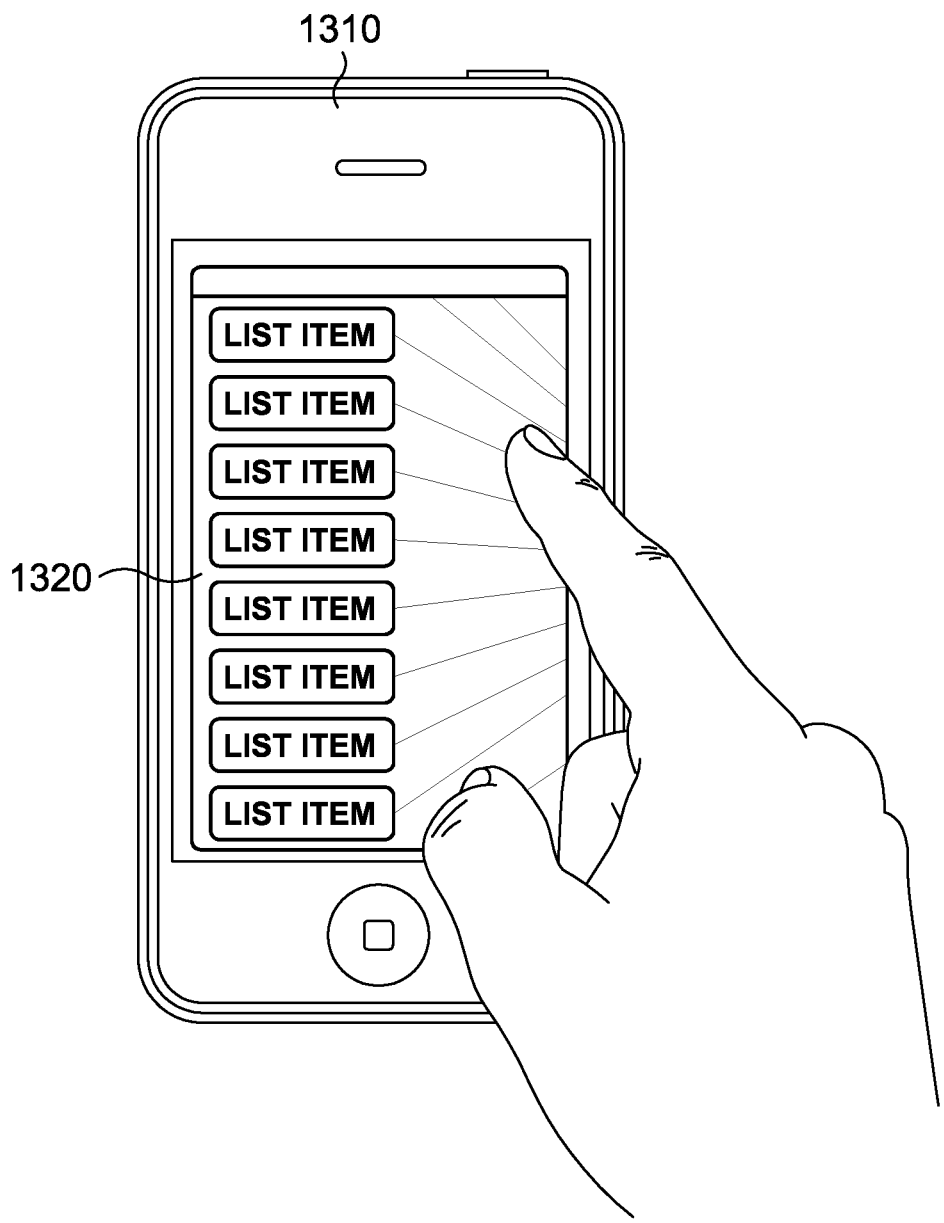
FIG. 13 depicts an exemplary display of a mobile telecommunications device illustrating a touch action, in accordance with an embodiment of the present invention.

FIG. 13 depicts an exemplary display 1320 of a mobile telecommunications device 1310 illustrating a touch action, in accordance with an embodiment of the present invention. FIG. 13 is similar to FIG. 12, except that the touch action on display 1320 is located further to the right, indicating a faster scrolling rate than the exact same touch action in the embodiment of FIG. 12 (e.g., same flick action, beginning and ending points on same horizontal axis).

Figure 14:
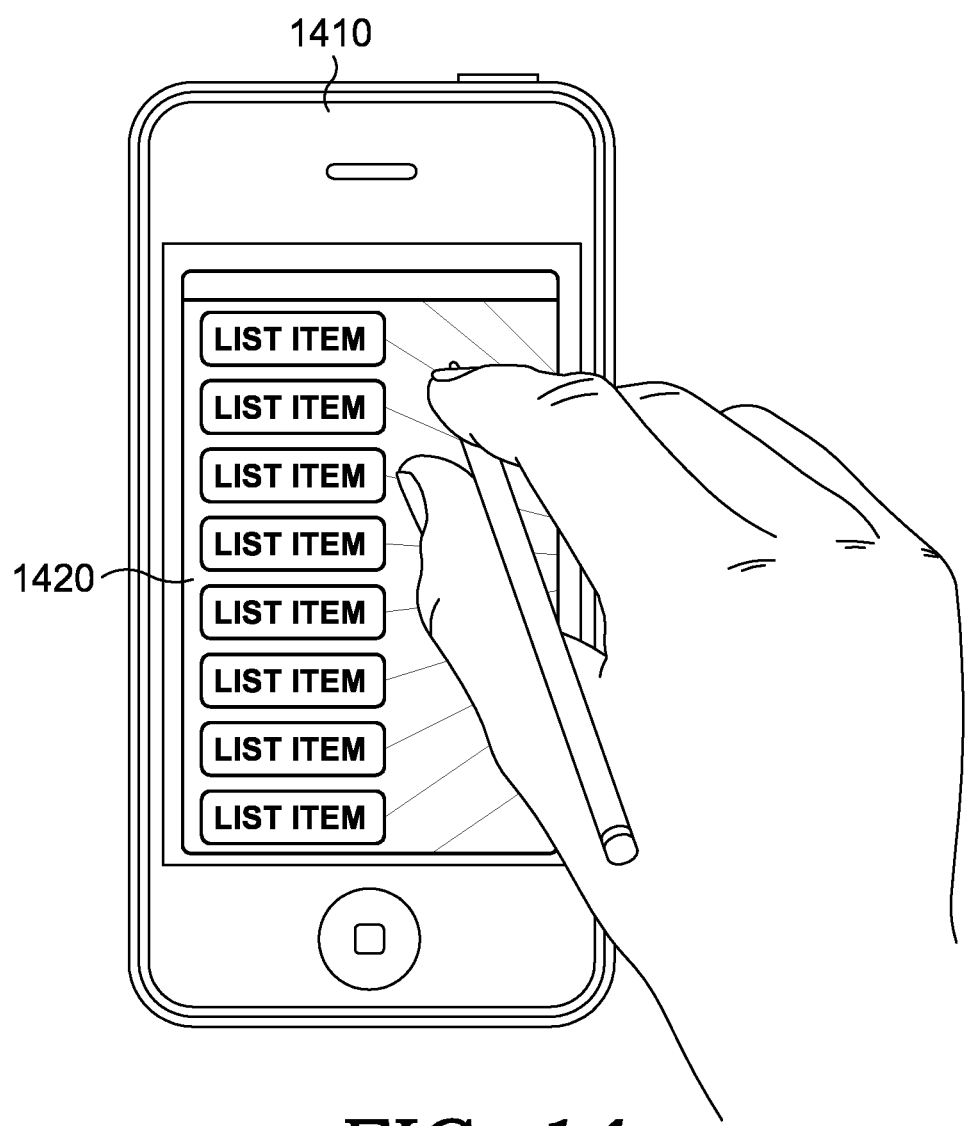
FIG. 14 depicts an exemplary display of a mobile telecommunications device illustrating a touch action made by a stylus in a region beside a list of items, in accordance with an embodiment of the present invention.

Turning to FIG. 14, an exemplary display 1420 of a mobile telecommunications device 1410 is depicted, which illustrates a touch action made by a stylus in a region beside a list of items, in accordance with an embodiment of the present invention. As with any object, a stylus may be used to perform the touch action to indicate a desire to scroll through the list of items.

FIG. 15 depicts an exemplary display 1520 of a mobile telecommunications device 1510 illustrating a list of items connected to a single point by a set of lines, in accordance with an embodiment of the present invention. Here, the device 1510 is positioned horizontally, such that although items have the same width as those in FIG. 13, for example, there is more space to scroll through the list of items beside the list of items than there is when the device 1510 is positioned vertically, as illustrated in the other figures herein. The embodiment of FIG. 15 may be beneficial to a user in that it provides a more accurate indication as to the length of the list of items, as more lines may be visible here than in embodiments with the device positioned vertically.

Figure 16:
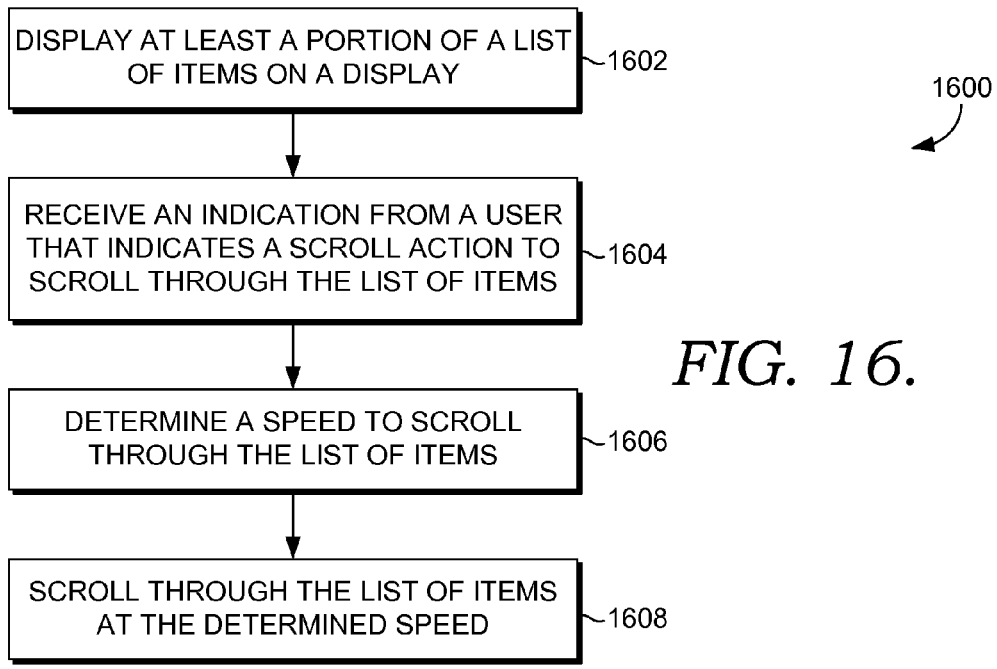
FIG. 16 illustrates a flow diagram of a method for scrolling at variable speeds through a list of items that are presented on a display of an electronics device, in accordance with an embodiment of the present invention.

Referring to FIG. 16, a flow diagram is illustrated of a method 1600 for scrolling at variable speeds through a list of items that are presented on a display of an electronics device, in accordance with an embodiment of the present invention. Initially, step 1602 indicates that at least a portion of a list of items are displayed on a display. Depending on the size of the list of items (e.g., number of items in a list, size of each item on the display), the entire list or just a portion may be visible on the display. At step 1604, an indication from a user is received that indicates a scroll action to scroll through the list of items. The indication may include a starting point and an ending point that are in a certain portion of the display. An indication of a scroll action may include, but is not limited to, a touch action, or any indication made by a hardware component of an electronics device. A touch action may be a press and drag action, a flick action, or the like. A flick action imparts velocity to a list of items and slides or moves the list in a direction corresponding to the flick action. The list of items accelerates, and upon release of the flick action, an algorithm is applied to determine a deceleration of the list of items. The algorithm may determine an acceleration and deceleration based on the position of the flick action on the display.

As discussed above in regard to FIG. 3, another embodiment may include regions of a display that each have predetermined speeds. Region boundaries may be determined by many factors. For example, each region may be a certain number of pixels, such as 1 pixel per region. The regions may also be divided according to the length of the list of items. Regardless of how the display is divided into regions, the further that an indication to scroll progresses from one side of the display to another, the scroll speed increases, whether the scroll speed is predetermined or calculated using an algorithm.

Step 1606 indicates that a speed to scroll through the list of items is determined and is based on the certain portion. The certain portion may be a region of the display. As discussed above, a scrolling speed may be predetermined based on regions of the display, or may be determined by an algorithm that calculates speed or velocity verses the certain position of the touch action (e.g., flick action). Finally, at step 1608, the list of items is scrolled through at the determined speed.

Figure 17:
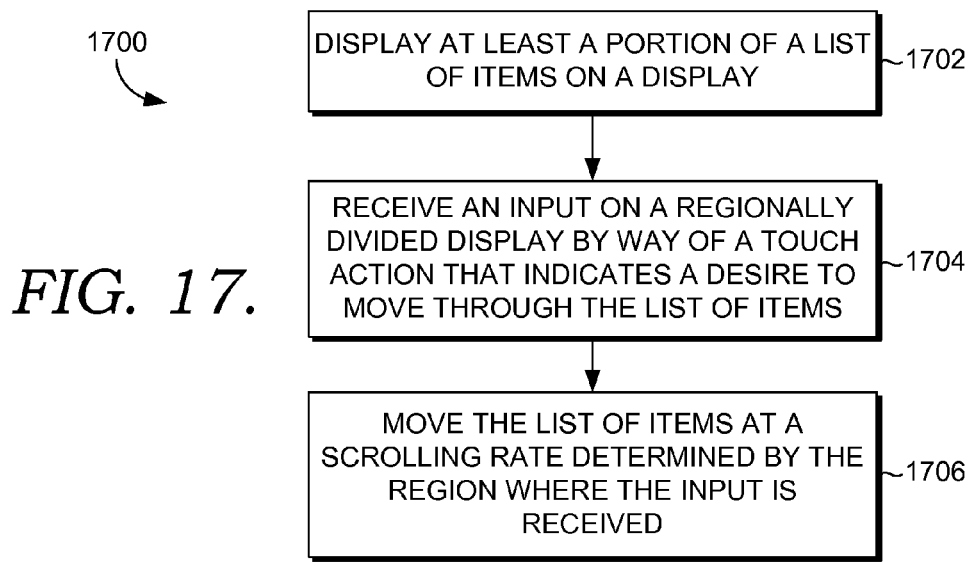
FIG. 17 illustrates a flow diagram of a method for enabling a user to move at variable speeds through a list of items on a display of a mobile telecommunications device, wherein the display is a touchscreen, in accordance with an embodiment of the present invention.

Turning now to FIG. 17, a flow diagram is shown of a method 1700 for enabling a user to move at variable speeds through a list of items on a display of a mobile telecommunications device, wherein the display is a touchscreen, in accordance with an embodiment of the present invention. At an initial step of 1702, at least a portion of the list of items on the display is displayed. An input on a display is received at step 1704 by way of a touch action from a user that indicates the user's desire to move through the list of items. As discussed above, a touch action may be a press and drag, flick action, or the like, and may be made by any object such as, but not limited to, a finger, fingernail, or stylus. The display may be divided into more than one region, and the input (e.g., touch action) may be received within one of the regions. At step 1706, the list of items is moved at a scrolling rate determined by the regions where the input is received. The scrolling rate may be predetermined for each region. If the user's input is in the form of a flick action, the scrolling rate may be calculated using an algorithm, for example, wherein there is a different speed translation for the same flick action in different areas of the display.

As mentioned above, there are several features that may be variable. The set of lines on a display not only provides a clear visual indication to a user as to the length of the list of items but also indicates to the user the current position in the list of items. The appearance of the set of lines may be changed (e.g., more or less lines shown on the display) as the location of the single point is varied. Moving the location of the single point, for example, may change the number of lines shown on the display at one time. For example, the closer the single point is to the display, the more lines may be visible on the display. If the single point is located further from the display, fewer lines may be visible on the display. This is clearly illustrated by FIGS. 6 and 7 herein. In addition, the area beside the list of items may be modifiable, as the more area there is, the more variation of scrolling rates a user may have. This area may be increased by decreasing the width of the items, for example. In addition, positioning a mobile communications device horizontally (e.g., landscape view) may also provide more regions for an indication to scroll, such as a touch action.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable media having computer-useable instructions embodied thereon for performing a method of scrolling at variable speeds through a list of items that are presented on a display of an electronics device, the method comprising:
 displaying a portion of the list of items on the display, wherein each item within the list of items is associated with a visible line to form a set of visible lines which converge toward a dynamically adjustable single point, wherein the set of visible lines provides a visual indication of a placement of the displayed portion relative to the list of items;
 receiving an indication from the user that indicates a scroll action to scroll through the list of items with the associated visible lines, wherein the indication includes a starting point and an ending point that are in a certain portion of the display;
 based on the certain portion of the display and a position of the dynamically adjustable single point in relation to the list of items, determining a speed to scroll through the list of items, wherein a variance of available speeds to scroll through the list of items is proportionally related to a distance the dynamically adjustable single point is from the list of items; and
 scrolling through the list of items at the determined speed.

2. The computer-readable media of claim 1, wherein the list of items includes a certain number of items, and the certain number of items is considered when determining a speed to scroll through the list of items.

3. The computer-readable media of claim 1, wherein the certain portion of the display is defined by collinear points.

4. The computer-readable media of claim 1, wherein the set of visible lines indicates the number of items in the list of items.

5. The computer-readable media of claim 1, wherein the point is not visible on the display.

6. The computer-readable media of claim 1, further comprising adjusting the position of the single point in relation to the list of items based on a number of items in the list of items.

7. The computer-readable media of claim 1, wherein the set of visible lines is visible on the display.

8. One or more computer-readable media having computer-useable instructions embodied thereon for performing a method of enabling a user to move at variable speeds through a list of items on a display of a mobile telecommunications device, wherein the display is a touchscreen, the method comprising:
 displaying a portion of the list of items on the display, wherein each of the items in the list of items is connected to a dynamically adjustable single point by a visible line, thereby creating a set of visible lines;
 dynamically adjusting a position of the dynamically adjustable single point in relation to the list of items, such that a closer position of the dynamically adjustable single point to the list of items results in a faster scrolling speed of the list of items, and a more distant position of the dynamically adjustable single point to the list of items results in a slower scrolling speed of the list of items;
 receiving a scrolling action on the display by way of a touch action from a user that indicates a desire to move through the list of items, wherein the display is divided into more than one region, wherein the scrolling action is received within one of the regions, and wherein a number of the visible lines lie within the region in which the scrolling action is received; and
 moving the list of items at a scrolling rate determined by the region where the scrolling action is received and the position of the dynamically adjustable single point in relation to the list of items,
 wherein a greater number of items of the list of items are scrolled through when the dynamically adjustable single point is located at the closer position to the list of items and a lesser number of items of the list of items are scrolled through when the dynamically adjustable single point is located at the distant position to the list of items, and wherein a scrolling speed of the list is proportional to the number of the visible lines that lie within the region in which the scrolling action is received.

9. The computer-readable media of claim 8, wherein dynamically adjusting the position of the single point is based on a length of the list of items.

10. The computer-readable media of claim 8, wherein the list of items consumes a minority of the display.

11. The computer-readable media of claim 8, wherein the scrolling rate includes a period of acceleration.

12. The computer-readable media of claim 11, wherein the scrolling rate includes a period of deceleration.

13. The computer-readable media of claim 12, wherein the deceleration occurs upon release of the touch action.

14. The computer-readable media of claim 8, wherein the touch action from a user is made by one or more of:
- the user's finger; or
- a stylus.

15. A mobile communications device comprising:
- a first storage component that stores a list of items that are associated with a dynamically adjustable single point having a location, the dynamically adjustable single point being connected to a set of visible lines, each line of the set of visible lines being connected to an item on the list of items;
- a touchscreen that receives input by way of touch actions, and that displays a user interface; and
- a set of computer-useable instructions embodied in a second storage component that provides for a display of at least a portion of the list of items that, when motivated to be moved, accelerates at a rate dependent upon,
  - A) a position on the touchscreen of a touch action, wherein the touch action comprises a starting point and an ending point, and wherein upon release of the touch action, the list of items decelerates, and
  - B) the location of the dynamically adjustable single point in relation to the list of items,
- wherein for a given position of the touch action, a greater number of items of the list of items are scrolled through when the position of the dynamically adjustable single point is closer to the list of items, and
- wherein for the same given position of the touch action a lesser number of items of the list of items are scrolled through when the position of the dynamically adjustable single point is farther from the list of items.

16. The mobile communications device of claim 15, wherein the first storage component is the same as the second storage component.

17. The mobile communications device of claim 15, wherein the set of visible lines is visible on the display.

18. The mobile communications device of claim 15, wherein the amount of space on the display occupied by the list of items is adjustable.

* * * * *